(12) United States Patent
Kim

(10) Patent No.: US 7,800,588 B2
(45) Date of Patent: Sep. 21, 2010

(54) FUNCTION BUTTON AND METHOD OF INPUTTING LETTER USING THE SAME

(76) Inventor: Min Ho Kim, 301 Samyang Villa, 593-14 Chang 2 dong, Dobong-gu, Seoul (KR)

( * ) Notice: Subject to any disclaimer, the term of this patent is extended or adjusted under 35 U.S.C. 154(b) by 958 days.

(21) Appl. No.: 11/578,457

(22) PCT Filed: May 6, 2005

(86) PCT No.: PCT/KR2005/001333

§ 371 (c)(1),
(2), (4) Date: Oct. 16, 2006

(87) PCT Pub. No.: WO2005/109839

PCT Pub. Date: Nov. 17, 2005

(65) Prior Publication Data

US 2007/0242049 A1    Oct. 18, 2007

(30) Foreign Application Priority Data

May 7, 2004    (KR) .................. 20-2004-0012836 U

(51) Int. Cl.
*G06F 3/02*    (2006.01)

(52) U.S. Cl. .......................... 345/168; 345/171; 341/21

(58) Field of Classification Search ......... 345/156–157, 345/168–172; 341/21–23

See application file for complete search history.

(56) References Cited

U.S. PATENT DOCUMENTS

| | | | |
|---|---|---|---|
| 5,631,643 A * | 5/1997 | Hisamori et al. | 341/23 |
| 5,952,942 A * | 9/1999 | Balakrishnan et al. | 341/20 |
| 7,385,591 B2 * | 6/2008 | Goodman | 345/172 |
| 7,489,301 B2 * | 2/2009 | Chen et al. | 345/168 |
| 2003/0043128 A1 * | 3/2003 | Kimura et al. | 345/204 |

* cited by examiner

*Primary Examiner*—Kimnhung Nguyen
(74) *Attorney, Agent, or Firm*—Rabin & Berdo, P.C.

(57) ABSTRACT

Disclosed herein are a keypad having a function button used to easily input characters in cellular phones and other character input devices and a method of easily inputting various languages and letters using the function button. The function button is set independently of a menu button. Whenever the function button is pushed in a default character input mode, the default character input mode is changed to an upper-case letter input mode, a lower-case letter input mode, a sentence mark input mode, a numeral input mode, a special character input mode and other language input modes. After a desired character has been inputted in a corresponding changed input mode, the function button is pushed to rapidly return to the initial character input mode. Various sentence marks can be effectively inputted using the function button.

16 Claims, 2 Drawing Sheets

Prior Art

FUNCTION BUTTON AND METHOD OF INPUTTING LETTER USING THE SAME

TECHNICAL FIELD

The present invention relates to technology for a keypad system, and more particularly, to a technique of inputting punctuation marks, Arabic numerals, English characters, special characters, and so on, when sentences are inputted therein through a character input device, such as a keypad of a mobile phone.

BACKGROUND ART

Input buttons of a keypad of a conventional mobile phone and a character input device are marked with English characters and Arabic numerals thereon. For example, as shown in FIG. 1 illustrating a keypad, the keypad is configured so that a group of QZ(1), ABC(2), DEF(3), GHI(4), JKL(5), MNO (6), PRS(7), TUV(8) and WXY(9) can be allocated to input buttons thereof, respectively, or a group of ABC(2), DEF(3), GHI(4), JKL(5), MNO(6), PRS(7), TUV(8) and WXYZ(9) can be allocated to input buttons, respectively. Here, the numerals in the parentheses indicate a series of buttons which are allocated together with corresponding characters. Although the keypad is implemented so that each input button has English characters and numerals, the input button can be modified to allocate characters depending on the language of a corresponding nation or to allocate the characters together with English characters as occasion demands.

A conventional method of changing an input mode using a menu button is very inconvenient. When a user operates a menu button in a default input mode, various input modes are displayed on the screen, the user selects an input mode of the input modes using a direction key and an enter key. Whenever the users want to change an input mode, he or she should use the menu button repeatedly. Furthermore, whenever the user wants to return to the default input mode, the user should use the menu button repeatedly.

Also, since the punctuation marks, which are used to compose sentences, are included in a set of special characters, the character input mode must be frequently changed to the special character input mode using the menu button to input frequently used punctuation marks therein.

In the special characters input mode, a lot of special characters, such as $, {, @, =, <, &, ?, !, #, *, (, -, +, ^, %, and so on, can be inputted. These special characters include punctuation marks, which are frequently used to compose sentences, for example, a period (.), a question mark (?), a comma (,), a slash (/), and quotation marks (", "), a colon (:), a dash (-), a grave (`), a less than sign (<), and so on. However, the conventional character input method has disadvantages in that the character input mode must be changed using the menu button to an input mode, in which the punctuation marks and the special characters are marked together marked.

DISCLOSURE OF INVENTION

Therefore, it is an aspect of the invention to provide a function button and a method of inputting characters using the same. The invention is capable of easily and mutually changing between a default character input mode which is set by a manufacturer or user and different character input modes, such that punctuation marks, Arabic numerals, English characters, special characters, etc. can be easily inputted while sentences are inputted in the default character input mode.

Additional aspects and/or advantages of the invention will be set forth in part in the description which follows and, in part, will be obvious from the description, or may be learned by practice of the invention.

In accordance with an aspect of the present invention, the above and other objects can be accomplished by the provision of a character input device having a keypad system, comprising: a plurality of input buttons, which include character input buttons associated with each character input mode of a default character input mode and at least two predetermined other character input modes, and a function button, which is one of the plurality of input buttons included in the keypad system, for changing the default character input mode, wherein, the default character input mode is changed to one of the predetermined other character input modes according to the number of operations of the function button; and when one of the predetermined other character input modes is selected, characters corresponding to input buttons selected by a user are inputted.

DESCRIPTION OF DRAWINGS

These and/or other aspects and advantages of the invention will become apparent and more readily appreciated from the following description of the embodiments, taken in conjunction with the accompanying drawings of which.

BEST MODE CARRYING OUT THE INVENTION

The preferred embodiment of the present invention will be described in detail as follows with reference to the attached drawings.

Firstly, punctuation marks, which are frequently used to compose sentences, are separated from special characters to form an additional input mode for the frequently used punctuation marks. Here, the punctuation marks include a question mark (?), an exclamation mark (!), a period (.), a slash (/), a dash (-), parentheses ((, )), a less than sign (<), quotation marks (", "), a colon (:), a grave (`), etc.

One spare button of 12 input buttons of a keypad is set to a function button which is distinguished from a menu button, in which the function button is independently used with the menu button. Here, the 12 input buttons are composed of Arabic numerals (1, 2, . . . , 8, 9, 0), a asterisk button (*) and a hash button (#).

When the function button is repeatedly operated like operation of the menu button, the character input mode is changed from a default character input mode to a punctuation mark input mode, a numeral input mode, a special character input mode, an upper-case character input mode, and a lower-case character input mode, etc. Also, when the function button is re-operated after desired characters are inputted in the changed character input mode unlike the menu button, the character input mode is returned to the default character input mode.

Figure 1:
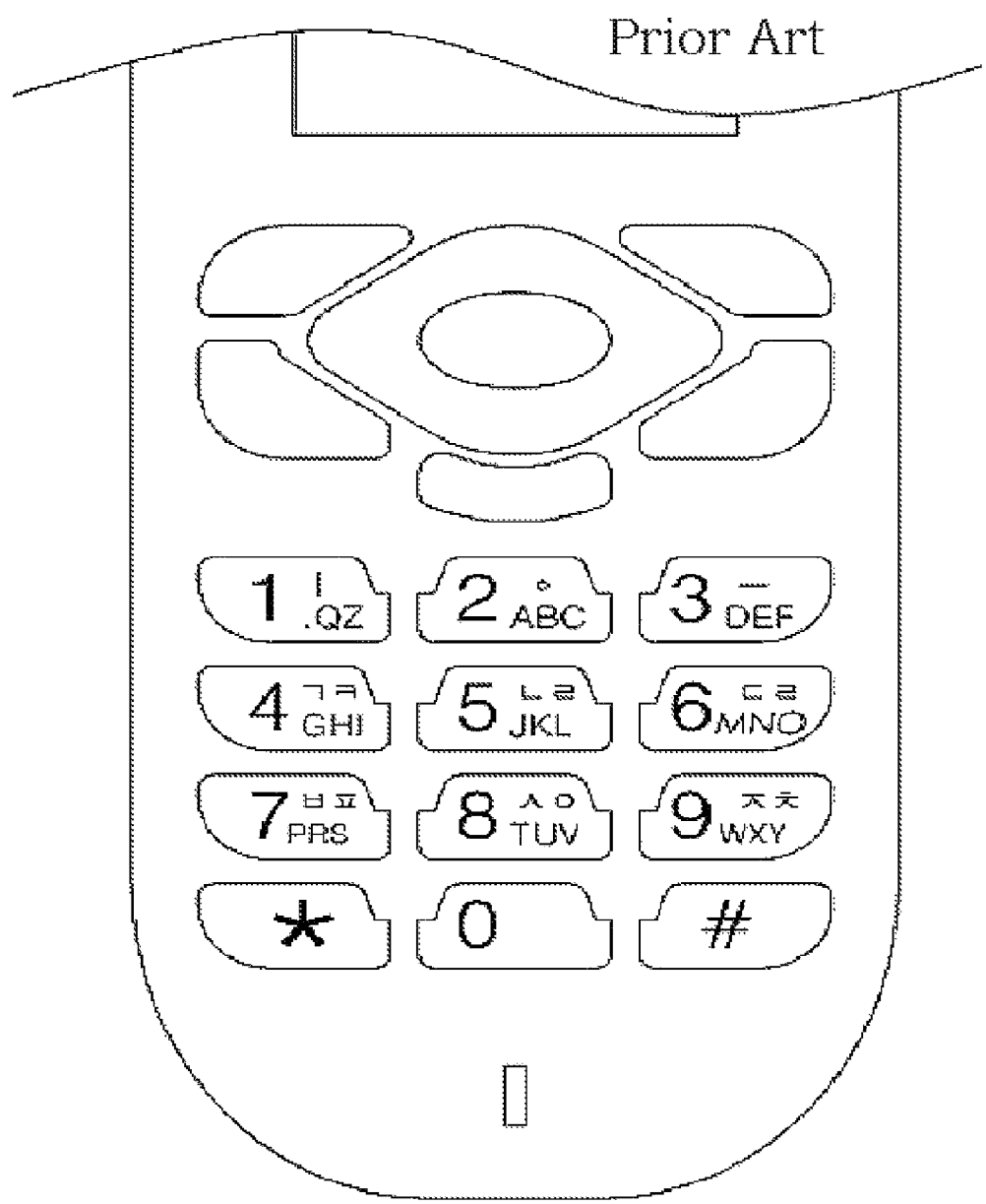
FIG. 1 illustrates a conventional keypad of a mobile phone.
Figure 2:
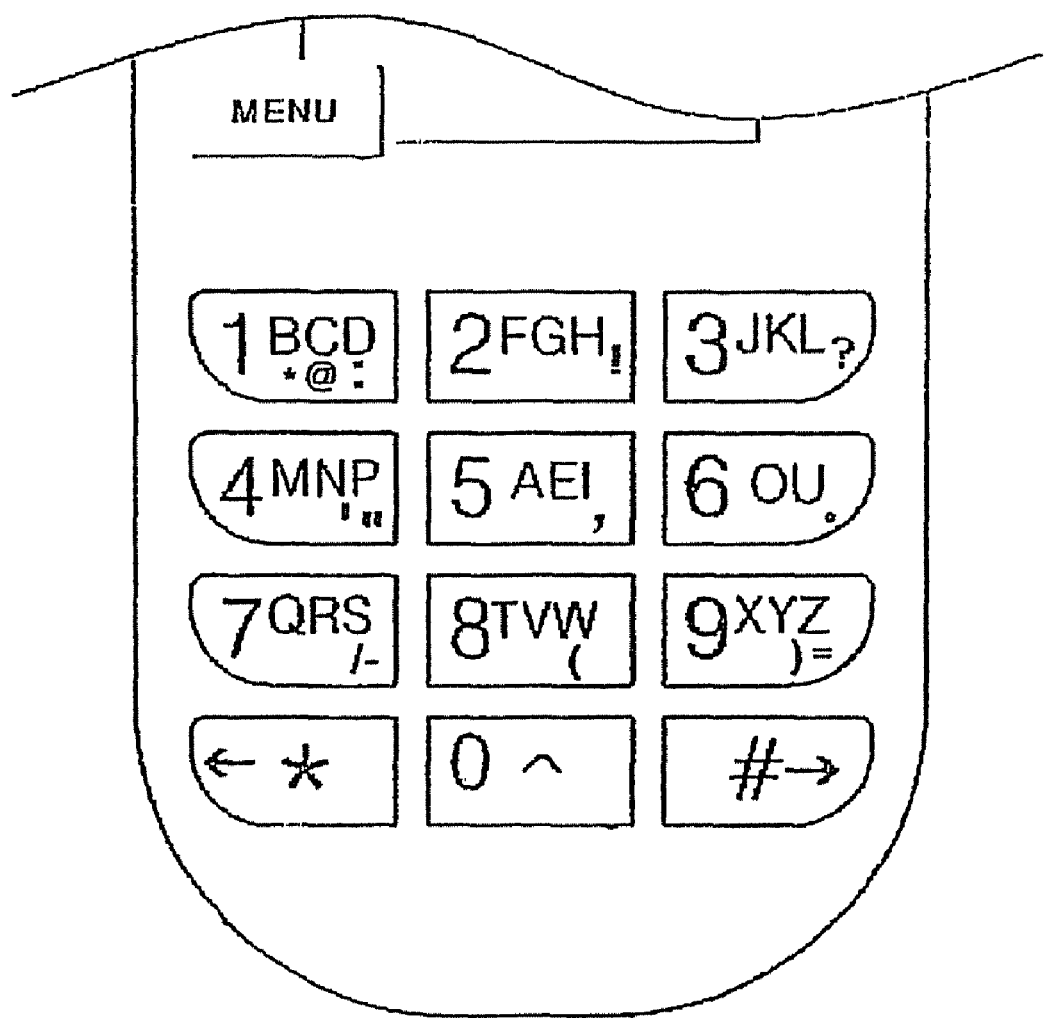
FIG. 2 illustrates a keypad of a mobile phone, according to the present invention.

For example, when the function button is operated once in the lower-case character input mode used as the default character input mode, the lower-case character input mode is changed to the upper-case letter input mode. When the function button is operated twice, the lower-case character input mode is changed to the punctuation mark input mode. When the function button is operated three times, the lower-case character input is changed to the numeral input mode. When the function button is operated four times, the lower-case character input mode is changed to a special character input mode. As shown in FIG. 2, one or more than one punctuation mark, which is inputted thereto in the punctuation mark input mode, is preferably allocated to each input button of the keypad.

In a case that the asterisk button (*) is set to the function button, when numeral 13 is to be inputted while lower-case characters are inputted in the lower-case character input mode used as the default character input mode, the asterisk button (*) is operated three times to change from the present mode to the numeral input mode. Afterwards, numeral 13 is successively inputted using the buttons 1 and 3 and then the asterisk button (*) is re-operated to change the numeral input mode to the lower-case character input mode.

On the other hand, in a case that the function button is allocated to a numeral button, when numeral 13 is inputted and then the function button is operated longer than a predetermined time, the character input mode is changed to the lower-case character input mode used as the default input mode from the numeral input mode.

Therefore, various characters and the punctuation marks, which are frequently used, can be easily inputted thereto, using the above-described function button.

The following is a description for use examples of the above-described function button with reference to FIG. 2. The embodiment of the present invention is described on the assumption that numeral button of zero (0) is set to a function button (ˆ).

Regarding a case that the function button is set to be operated, such that: when the function button is operated once in a default character input mode (a lower-case character input mode), the lower-case character input mode is changed to an upper-case character input mode; when it is operated twice, the lower-case character input mode is changed to a punctuation mark input mode; when it is operated three times, the lower-case character input mode is changed to a numeral input mode; and when it is operated four times, the lower-case character input mode is changed to a special character input mode.

When a sentence (Open 10 a.m. "Please see you tomorrow!") is to be inputted, the following procedure is performed.

Firstly, the lower-case character input mode is changed to the upper-case character input mode as the function button (ˆ) is operated once. A button '6' is operated once to input a upper-case character 'O' and then the function button (ˆ) is re-operated once to be returned to the lower-case character input mode. A button '4' is operated three times to input a lower-case character 'p' and then A button '5' is operated twice to input a lower-case character 'e'. After that, the button '4' is operated twice to input a lower-case character 'n'. As such, corresponding buttons are sequentially operated to input 'pen', thereby completing the word "Open". After that, the hash button (#) corresponding to a space bar button is operated once to insert a space at the end of the word "Open".

Afterwards, the function button (ˆ) is operated three times to enter the numeral input mode. And then, A button '1' is operated once to input "1"; and A button '0' is operated once shorter than a predetermined time to input "0", thereby inputting numeral "10". Since the button '0' in the numeral input mode simultaneously has a function to input numeral '0' and a function of a function button, the function button is set such that the numeral input mode can be returned to the lower-case character input mode used as a default character input mode, when it is operated longer than the predetermined time, and the numeral '0' can be inputted, when it is operated shorter than the predetermined time. Here, when the function button is operated longer than the predetermined time, the numeral '0' is briefly shown on a display but it disappears after being returned to the lower-case character input mode.

On the other hand, when the function button is allocated to an asterisk button (*), the numeral input mode can be immediately returned to the lower-case character input mode used as a default character input mode as the function button is operated shorter than the predetermined time.

After that, the hash button (#) is operated once to insert a space at the end of the numeral "10", and then the function button (ˆ) is operated longer than a predetermined time to return to the lower-case character input mode. Also, the button '5' is operated once to input a lower-case character "a", and the function button (ˆ) is operated twice to enter the punctuation mark input mode, and then the button '6' is operated once to input a period (.). Afterwards, the function button (ˆ) is operated once to return to the lower-case character input mode. Also, the button '4' is operated once to input a lower-case character "m". Then, the function button (ˆ) is operated twice to enter the punctuation mark input mode, and the button '6' is operated once to input a period (.). Therefore, the phrase "10 a.m." has been completed.

Subsequently, the hash button (#) is operated once to insert a space at the end of the word "10 a.m.". The button '4' is operated twice to input a double quotation mark ("). After that, the function button (ˆ) is operated once to return to the lower-case character input mode. Again, the function button (ˆ) is operated once to enter the upper-case character input mode, and the button '4' is operated three times to input an upper-case character "P", and then the function button (ˆ) is operated once to return to the lower-case character input mode. Similarly, "lease" is inputted thereto using buttons 3, 5, and 7, the word "Please" has been completed.

In succession, the hash button (#) is operated once to insert a space at the end of the word "Please", and then, phrase "see you tomorrow" is inputted thereto using the hash button (#) and corresponding character input buttons as above. After a last lower-case character "w" of the word "tomorrow" is inputted, the function button (ˆ) is operated twice to enter the punctuation mark input mode, and a button '2' is operated once to input the exclamation mark "!", and then the button '4' is operated twice to input a double quotation mark ("). Therefore, the sentence (Open 10 a.m. "Please see you tomorrow!") has been completed.

Although the embodiment of the present invention has described a method for changing the character input mode and returning to a default character input mode using the function button, it will be appreciated that there are many modifications based on the embodiment. Namely, the method can be performed as the menu button and function buttons are operated in conjunction with one another.

For example, a default character input mode is changed to a specified character input mode using the menu button. After desired characters are inputted in the specified character input mode, the specified character input mode can be returned to the default character input mode by operating the function button.

For example, when numeral '13' is to be inputted while in a default character input mode in which lower-case characters are being inputted in a lower-case characters input mode, the lower-case characters input mode is changed to the numeral input mode by the menu button so as to input the numeral '13'. After that, when the function button is operated, the numeral input mode is changed to the lower-case characters input mode.

The present invention can be identically applied to French, German, Korean, Japanese and other languages in addition to English.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A character input device having a keypad system, comprising:
   a plurality of input buttons, which include character input buttons associated with each character input mode of a default character input mode and at least two predetermined other character input modes, and
   a function button, which is one of the plurality of input buttons included in the keypad system, for changing the default character input mode,
   wherein,
   the default character input mode is changed to one of the predetermined other character input modes according to the number of operations of the function button; and
   when one of the predetermined other character input modes is selected, characters corresponding to input buttons selected by a user are inputted.

2. The character input device as set forth in claim 1, wherein:
   a numeral corresponding to the input button selected by the user is inputted when a numeral input mode is selected by the function button, in a case that one of a plurality of numeral buttons, which is included in the keypad system, is set to the function button; and
   the selected numeral input mode is changed to the default character input mode when the function button is re-operated longer than a predetermined time period, after the numeral is inputted in the numeral input mode.

3. The character input device as set forth in claim 1, wherein the default character input mode is an English character input mode.

4. The character input device as set forth in claim 1, wherein the default character input mode is a French character input mode.

5. The character input device as set forth in claim 1, wherein the default character input mode is a German character input mode.

6. The character input device as set forth in claim 1, wherein the default character input mode is a Greek character input mode.

7. The character input device as set forth in claim 1, wherein the default character input mode is a Spanish character input mode.

8. The character input device as set forth in claim 1, wherein the default character input mode is a Chinese character input mode.

9. The character input device as set forth in claim 1, wherein the default character input mode is a Japanese character input mode.

10. The character input device as set forth in claim 1, wherein:
    the character input modes include an input mode for punctuation marks;
    a punctuation mark corresponding to the input button selected by the user is inputted, when the punctuation mark input mode is selected by the function button;
    the selected character input mode is changed to the default character input mode when the function button is re-operated, after the punctuation mark is inputted.

11. The character input device as set forth in claim 10, wherein one or more than one punctuation mark is allocated to each of the character input buttons.

12. The character input device as set forth in claim 1, wherein:
    the selected character input mode is changed to the default character input mode when the function button is re-operated, after the character is inputted in the selected character input mode.

13. The character input device as set forth in claim 12, wherein:
    a numeral corresponding to the input button selected by the user is inputted when a numeral input mode is selected by the function button, in a case that one of a plurality of numeral buttons, which is included in the keypad system, is set to the function button; and
    the selected numeral input mode is changed to the default character input mode when the function button is re-operated longer than a predetermined time period, after the numeral is inputted in the numeral input mode.

14. The character input device as set forth in claim 12, wherein:
    the character input modes include an input mode for punctuation marks;
    a punctuation mark corresponding to the input button selected by the user is inputted, when the punctuation mark input mode is selected by the function button;
    the selected character input mode is changed to the default character input mode when the function button is re-operated, after the punctuation mark is inputted.

15. The character input device as set forth in claim 12, wherein the character input device is a mobile phone.

16. The character input device as set forth in claims 1, wherein the character input device is a mobile phone.

* * * * *